United States Patent [19]
Zones

[11] Patent Number: 4,834,958
[45] Date of Patent: May 30, 1989

[54] ZEOLITE SSZ-24

[75] Inventor: Stacey I. Zones, San Francisco, Calif.

[73] Assignee: Chevron Research Company, San Francisco, Calif.

[21] Appl. No.: 14,959

[22] Filed: Feb. 17, 1987

Related U.S. Application Data

[63] Continuation-in-part of Ser. No. 823,704, Jan. 29, 1986, abandoned.

[51] Int. Cl.$^4$ .................. C01B 35/10; C01B 33/20; C01B 33/28
[52] U.S. Cl. .................. 423/277; 423/326; 423/328; 423/618; 423/624; 423/632
[58] Field of Search .............. 423/326, 328, 329, 277, 423/331, 332, 618, 624, 632; 502/60–62, 77, 202, 74

[56] References Cited

U.S. PATENT DOCUMENTS

| | | | |
|---|---|---|---|
| 4,544,538 | 10/1985 | Zones | 423/326 |
| 4,610,854 | 9/1986 | Zones | 423/326 |
| 4,665,110 | 5/1987 | Zones | 423/277 |

Primary Examiner—John Doll
Assistant Examiner—R. Bruce Breneman
Attorney, Agent, or Firm—S. R. La Paglia; T. G. DeJonghe; V. J. Cavalieri

[57] ABSTRACT

A crystalline zeolite SSZ-24 is prepared using an adamantane quaternary ion as a template.

10 Claims, No Drawings

ZEOLITE SSZ-24

This is a continuation-in-part of Ser. No. 823,704, filed Jan. 29, 1986 now abandoned.

BACKGROUND OF THE INVENTION

Natural and synthetic zeolitic crystalline aluminosilicates are useful as catalysts and adsorbents. These aluminosilicates have distinct crystal structures which are demonstrated by X-ray diffraction. The crystal structure defines cavities and pores which are characteristic of the different species. The adsorptive and catalytic properties of each crystalline aluminosilicate are determined in part by the dimensions of its pores and cavities. Thus, the utility of a particular zeolite in a particular application depends at least partly on its crystal structure.

Because of their unique molecular sieving characteristics, as well as their catalytic properties, crystalline aluminosilicates are especially useful in such applications as gas drying and separation and hydrocarbon conversion. Although many different crystalline aluminosilicates and silicates have been disclosed, there is a continuing need for new zeolites and silicates with desirable properties for gas separation and drying, hydrocarbon and chemical conversions, and other applications.

Crystalline aluminosilicates are usually prepared from aqueous reaction mixtures containing alkali or alkaline earth metal oxides, silica, and alumina. "Nitrogenous zeolites" have been prepared from reaction mixtures containing an organic templating agent, usually a nitrogen-containing organic cation. By varying the synthesis conditions and the composition of the reaction mixture, different zeolites can be formed using the same templating agent. Use of N,N,N-trimethyl cyclopentylammonium iodide in the preparation of Zeolite SSZ-15 molecular sieve is disclosed in my copending application Ser. No. 437,709, filed on Oct. 29, 1982 now U.S. Pat. No. 4,610,854; use of 1-azoniaspiro [4.4] nonyl bromide and N,N,N-trimethyl neopentylammonium iodide in the preparation of a molecular sieve termed "Losod" is disclosed in Helv. Chim. Acta (1974); Vol. 57, page 1533 (W. Sieber and W. M. Meier); use of quinuclidinium compounds to prepare a zeolite termed "NU-3" is disclosed in European Patent Publication No. 40016; use of 1,4-di(1-azoniabicyclo [2.2.2.]octane) lower alkyl compounds in the preparation of Zeolite SSZ-16 molecular sieve is disclosed in U.S. Pat. No. 4,508,837; use of N,N,N-trialkyl-1-adamantamine in the preparation of zeolite SSZ-13 molecular sieve is disclosed in U.S. Pat. No. 4,544,538.

SUMMARY OF THE INVENTION

I have prepared a family of crystalline aluminosilicate molecular sieves with unique properties, referred to herein as "Zeolite SSZ-24", or simply "SSZ-24", and have found a highly effective methode for preparing SSZ-24.

SSZ-24 has a mole ratio of an oxide selected from silicon oxide, germanium oxide, and mixtures thereof to an oxide selected from aluminum oxide, gallium oxide, iron oxide, boron oxide and mixtures thereof greater than about 100:1 and having the X-ray diffraction lines of Table 1 below. The zeolite further has a composition, as synthesized and in the anhydrous state, in terms of mole ratios of oxides as follows: (0.1 to 10)(Q$_2$O:(0.1 to 5.0)M$_2$O:W$_2$O$_3$:(greater than 100)YO$_2$ wherein M is an alkali metal cation, W is selected from aluminum, gallium, iron, boron and mixtures thereof, Y is selected from silicon, germanium and mixtures thereof, and Q is an adamantane quaternary ammonium ion. SSZ-24 zeolites can have a YO$_2$:W$_2$O$_3$ mole ratio greater than about 100:1 and can be made essentially alumina free. As prepared, the silica:alumina mole ratio is typically in the range of 100:1 to about 10,000:1. Higher mole ratios can be obtained by treating the zeolite with chelating agents or acids to extract aluminum from the zeolite lattice. The silica:alumina mole ratio can also be increased by using silicon and carbon halides and other similar compounds. Preferably, SSZ-24 is an aluminosilicate wherein W is aluminum and Y is silicon.

Lower ratios of silica to alumina may also be obtained by using methods which insert alumina into the crystalline network. For example, alumina insertion may occur by thermal treatment of the zeolite in combination with an alumina binder or dissolved source of alumina. Such procedures are described in the prior art, e.g., U.S. Pat. Nos. 4,599,315 and 4,550,092.

By "essentially alumina-free" as used herein, refers to silicaceous crystalline molecular sieves wherein any alumina is present as an impurity in the starting materials but for the impurity would not be present in the silicate.

My invention also involves a method for preparing SSZ-24 zeolites, comprising preparing an aqueous mixture containing sources of an adamantane quaternary ammonium ion, an oxide selected from aluminum oxide, gallium oxide, iron oxide, boron oxide and mixtures thereof, and an oxide selected from silicon oxide, germanium oxide, and mixtures thereof, and having a composition, in terms of mole ratios of oxides, falling within the following ranges: YO$_2$/W$_2$O$_3$, 100:1 to infinity (essentially pure YO$_2$); wherein Y is selected from silicon, germanium, and mixtures thereof, W is selected from aluminum, gallium, iron, boron and mixtures thereof, and Q is an adamantane quaternary ammonium ion; maintaining the mixture at a temperature of at least 100° C. until the crystals of said zeolite are formed; and recovering said crystals.

DETAILED DESCRIPTION OF THE INVENTION

SSZ-24 zeolites, as synthesized, have a crystalline structure whose X-ray powder diffraction pattern shows the following characteristic lines:

TABLE 1

| 2 θ | d/n | I/I$_o$ |
| --- | --- | --- |
| 7.50 | 11.79 | 98 |
| 13.00 | 6.89 | 10 |
| 15.00 | 5.91 | 46 |
| 19.91 | 4.46 | 100 |
| 21.42 | 4.15 | 36 |
| 22.64 | 3.93 | 87 |
| 26.16 | 3.41 | 44 |
| 29.37 | 3.04 | 13 |
| 30.31 | 2.949 | 30 |
| 34.86 | 2.574 | 20 |
| 38.29 | 2.351 | 7 |

Typical SSZ-24 aluminosilicate zeolites have the X-ray diffraction pattern of Tables 2 and 4 below.

The X-ray powder diffraction patterns were determined by standard techniques. The radiation was the K-alpha/doublet of copper and a scintillation counter spectrometer with a strip-chart pen recorder was used. The peak heights I and the positions, as a function of $2\theta$ where $\theta$ is the Bragg angle, were read from the spectrometer chart. From these measured values, the relative intensities, $100I/I_0$, where $I_0$ is the intensity of the strongest line or peak, and d, the interplanar spacing in Angstroms corresponding to the recorded lines, can be calculated. The X-ray diffraction pattern of Table 1 is characteristic of SSZ-24 zeolites. The zeolite produced by exchanging the metal or other cations present in the zeolite with various other cations yields substantially the same diffraction pattern although there can be minor shifts in interplanar spacing and minor variations in relative intensity. Minor variations in the diffraction pattern can also result from variations in the organic compound used in the preparation and from variations in the silica-to-alumina mole ratio from sample to sample. Calcination can also cause minor shifts in the X-ray diffraction pattern. Notwithstanding these minor perturbations, the basic crystal lattice structure remains unchanged.

SSZ-24 zeolites can be suitably prepared from an aqueous solution containing sources of an alkali metal oxide, an adamantane quaternary ammonium ion, an oxide of aluminum, gallium, iron, boron or mixtures thereof, and an oxide of silicon or germanium, or mixture of the two. The reaction mixture should have a composition in terms of mole ratios falling within the following ranges:

|  | Broad | Preferred |
| --- | --- | --- |
| $YO_2/W_2O_3$ | 50–∞ |  |
| $OH^-/YO_2$ | 0.10–1.0 | 0.20–0.30 |
| $Q/YO_2$ | 0.05–0.50 | 0.10–0.20 |
| $M^+/YO_2$ | 0.05–0.30 | 0.05–0.15 |
| $H_2O/YO_2$ | 20–300 | 35–60 |
| $Q/Q + M^+$ | 0.30–0.70 | 0.40–0.60 | wherein Q is an adamantane quaternary ammonium ion, Y is silicon, germanium or both, and W is aluminum, gallium, iron, boron or mixtures thereof. M is an alkali metal, preferably sodium or potassium. The organic adamantane compound which acts as a source of the adamantane quaternary ammonium ion employed can provide hydroxide ion.

When using the adamantane quaternary ammonium hydroxide compound as a template, it has also been found that purer forms of SSZ-24 are prepared when there is an excess of adamantane compound present relative to the amount of alkali metal hydroxide and that when the $OH^-/SiO_2$ molar ratio is greater than 0.40, then $M^+/SiO_2$ molar ratio should be less than 0.02.

The adamantane quaternary ammonium ion component Q, of the crystallization mixture, is derived from an adamantane quaternary ammonium compound. Preferably, the adamantane quaternary ammonium ion is derived from a compound of the formula

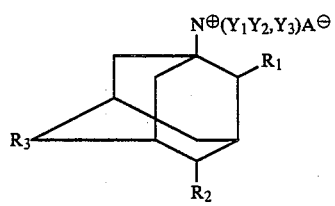

(a)

wherein each of $Y_1$, $Y_2$ and $Y_3$ independently is lower alkyl and most preferably methyl; $A^\ominus$ is an anion which is not detrimental to the formation of the zeolite; and each of $R_1$, $R_2$, and $R_3$ independently is hydrogen, or lower alkyl and most preferably hydrogen; and

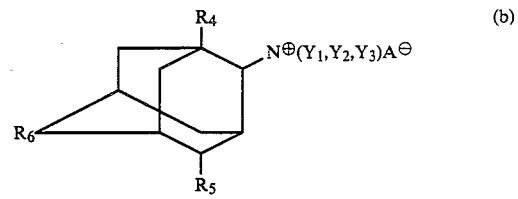

(b)

wherein each of $R_4$, $R_5$ and $R_6$ independently is hydrogen or lower alkyl; and most preferably hydrogen; each of $Y_1$, $Y_2$ and $Y_3$ independently is lower alkyl and most preferably methyl; and $A^\ominus$ is an anion which is not detrimental to the formation of the zeolite;

The adamantane quaternary ammonium compounds are prepared by methods known in the art.

By "lower alkyl" is meant alkyl of from about 1 to 5 carbon atoms.

$A^\ominus$ is an anion which is not detrimental to the formation of the zeolite. Representative of the anions include halogen, e.g., fluoride, chloride, bromide and iodide, hydroxide, acetate, sulfate, carboxylate, etc. Hydroxide is the most preferred anion. It may be beneficial to ion-exchange, for example, the halide for hydroxide ion, thereby reducing or eliminating the alkali metal hydroxide quantity required.

The reaction mixture is prepared using standard zeolitic preparation techniques. Typical sources of aluminum oxide for the reaction mixture include aluminates, alumina, and aluminum compounds such as $AlCl_3$ and $Al_2(SO_4)_3$. Typical sources of silicon oxide include silicates, silica hydrogel, silicic acid, colloidal silica, tetraalkyl orthosilicates, and silica hydroxides. Gallium, iron, boron and germanium can be added in forms corresponding to their aluminum and silicon counterparts. Salts, particularly alkali metal halides such as sodium chloride, can be added to or formed in the reaction mixture. They are disclosed in the literature as aiding the crystallization of zeolites while preventing silica occlusion in the lattice.

The reaction mixture is maintained at an elevated temperature until the crystals of the zeolite are formed. The temperatures during the hydrothermal crystallization step are typically maintained from about 140° C. to about 200° C., preferably from about 150° C. to about 170° C. and most preferably from about 135° C. to about 165° C. The crystallization period is typically greater than 1 day and preferably from about 3 days to about 7 days.

The hydrothermal crystallization is conducted under pressure and usually in an autoclave so that the reaction mixture is subject to autogenous pressure. The reaction mixture can be stirred during crystallization.

Once the zeolite crystals have formed, the solid product is separated from the reaction mixture by standard mechanical separation techniques such as filtration. The crystals are water-washed and then dried, e.g., at 90° C. to 150° C. for from 8 to 24 hours, to obtain the as synthesized, SSZ-24 zeolite crystals. The drying step can be performed at atmospheric or subatmospheric pressures.

During the hydrothermal crystallization step, the SSZ-24 crystals can be allowed to nucleate spontaneously from the reaction mixture. The reaction mixture can also be seeded with SSZ-24 crystals both to direct, and accelerate the crystallization, as well as to minimize the formation of undesired aluminosilicate contaminants. If the reaction mixture is seeded with SSZ-24 crystals, the concentration of the organic compound can be greatly reduced or eliminated, but it is preferred to have some organic compound present, e.g., an alcohol.

The synthetic SSZ-24 zeolites can be used as synthesized or can be thermally treated (calcined). Usually, it is desirable to remove the alkali metal cation by ion exchange and replace it with hydrogen, ammonium, or any desired metal ion. The zeolite can be leached with chelating agents, e.g., EDTA or dilute acid solutions, to increase the silica:alumina mole ratio. The zeolite can also be steamed; steaming helps stabilize the crystalline lattice to attack from acids. The zeolite can be used in intimate combination with hydrogenating components, such as tungsten, vanadium, molybdenum, rhenium, nickel, cobalt, chromium, manganese, or a noble metal, such as palladium or platinum, for those applications in which a hydrogenation-dehydrogenation function is desired. Typical replacing cations can include metal cations, e.g., rare earth, Group IIA and Group VIII metals, as well as their mixtures. Of the replacing metallic cations, cations of metals such as rare earth, Mn, Ca, Mg, Zn, Cd, Pt, Pd, Ni, Co, Ti, Al, Sn, Fe and Co are particularly preferred.

The hydrogen, ammonium, and metal components can be exchanged into the zeolite. The zeolite can also be impregnated with the metals, or, the metals can be physically intimately admixed with the zeolite using standard methods known to the art. And, the metals can be occluded in the crystal lattice by having the desired metals present as ions in the reaction mixture from which the SSZ-24 zeolite is prepared.

Typical ion exchange techniques involve contacting the synthetic zeolite with a solution containing a salt of the desired replacing cation or cations. Although a wide variety of salts can be employed, chlorides and other halides, nitrates, and sulfates are particularly preferred. Representative ion exchange techniques are disclosed in a wide variety of patents including U.S. Pat. Nos. 3,140,249; 3,140,251; and 3,140,253. Ion exchange can take place either before or after the zeolite is calcined.

Following contact with the salt solution of the desired replacing cation, the zeolite is typically washed with water and dried at temperatures ranging from 65° C. to about 315° C. After washing, the zeolite can be calcined in air or inert gas at temperatures ranging from about 200° C. to 820° C. for periods of time ranging from 1 to 48 hours, or more, to produce a catalytically active product especially useful in hydrocarbon conversion processes.

Regardless of the cations present in the synthesized form of the zeolite, the spatial arrangement of the atoms which form the basic crystal lattice of the zeolite remains essentially unchanged. The exchange of cations has little, if any, effect on the zeolite lattice structures.

The SSZ-24 aluminosilicate can be formed into a wide variety of physical shapes. Generally speaking, the zeolite can be in the form of a powder, a granule, or a molded product, such as extrudate having particle size sufficient to pass through a 2-mesh (Tyler) screen and be retained on a 400-mesh (Tyler) screen. In cases where the catalyst is molded, such as by extrusion with an organic binder, the aluminosilicate can be extruded before drying, or, dried or partially dried and then extruded. The zeolite can be composited with other materials resistant to the temperatures and other conditions employed in organic conversion processes. Such matrix materials include active and inactive materials and synthetic or naturally occurring zeolites as well as inorganic materials such as clays, silica and metal oxides. The latter may occur naturally or may be in the form of gelatinous precipitates, sols, or gels, including mixtures of silica and metal oxides. Use of an active material in conjunction with the synthetic zeolite, i.e., combined with it, tends to improve the conversion and selectivity of the catalyst in certain organic conversion processes. Inactive materials can suitably serve as diluents to control the amount of conversion in a given process so that products can be obtained economically without using other means for controlling the rate of reaction. Frequently, zeolite materials have been incorporated into naturally occurring clays, e.g., bentonite and kaolin. These materials, i.e., clays, oxides, etc., function, in part, as binders for the catalyst. It is desirable to provide a catalyst having good crush strength, because in petroleum refining the catalyst is often subjected to rough handling. This tends to break the catalyst down into powders which cause problems in processing.

Naturally occurring clays which can be composited with the synthetic zeolites of this invention include the montmorillonite and kaolin families, which families include the sub-bentonites and the kaolins commonly known as Dixie, McNamee, Georgia and Florida clays or others in which the main mineral constituent is halloysite, kaolinite, dickite, nacrite, or anauxite. Fibrous clays such as sepiolite and attapulgite can also be used as supports. Such clays can be used in the raw state as originally mined or can be initially subjected to calcination, acid treatment or chemical modification.

In addition to the foregoing materials, the SSZ-24 zeolites can be composited with porous matrix materials and mixtures of matrix materials such as silica, alumina, titania, magnesia, silica:alumina, silica-magnesia, silica-zirconia, silica-thoria, silica-beryllia, silica-titania, titania-zirconia as well as ternary compositions such as silica-alumina-thoria, silica-alumina-zirconia, silica-alumina-magnesia and silica-magnesia-zirconia. The matrix can be in the form of a cogel.

The SSZ-24 zeolites can also be composited with other zeolites such as synthetic and natural faujasites (e.g., X and Y), erionites, and mordenites. They can also be composited with purely synthetic zeolites such as those of the ZSM series. The combination of zeolites can also be composited in a porous inorganic matrix.

SSZ-24 zeolites are useful in hydrocarbon conversion reactions. Hydrocarbon conversion reactions are chemical and catalytic processes in which carbon containing compounds are changed to different carbon containing compounds. Examples of hydrocarbon conversion reactions include catalytic cracking, hydrocracking, and olefin and aromatics formation reactions. The catalysts are useful in other petroleum refining and hydrocarbon conversion reactions such as isomerizing n-paraffins and naphthenes, polymerizing and oligomerizing olefinic or acetylenic compounds such as isobutylene and butene-1, reforming, alkylating, isomerizing polyalkyl substituted aromatics (e.g., ortho xylene), and disproportionating aromatics (e.g., toluene) to provide mixtures of benzene, xylenes and higher methylbenzenes. The SSZ-24 catalysts have high selectivity, and under hydrocarbon conversion conditions can provide a high percentage of desired products relative to total products.

SSZ-24 zeolites can be used in processing hydrocarbonaceous feedstocks. Hydrocarbonaceous feedstocks contain carbon compounds and can be from many different sources, such as virgin petroleum fractions, recycle petroleum fractions, shale oil, liquefied coal, tar sand oil, and, in general, can be any carbon containing fluid susceptible to zeolitic catalytic reactions. Depending on the type of processing the hydrocarbonaceous feed is to undergo, the feed can contain metal or be free of metals, it can also have high or low nitrogen or sulfur impurities. It can be appreciated, however, that in general processing will be more efficient (and the catalyst more active) the lower the metal, nitrogen, and sulfur content of the feedstock.

Using SSZ-24 catalyst which contains a hydrogenation promoter, heavy petroleum residual feedstocks, cyclic stocks and other hydrocrackate charge stocks can be hydrocracked at hydrocracking conditions including a temperature in the range of from 175° C. to 485° C., molar ratios of hydrogen to hydrocarbon charge from 1 to 100, a pressure in the range of from 0.5 to 350 bar, and a liquid hourly space velocity (LHSV) in the range of from 0.1 to 30.

The hydrocracking catalysts contain an effective amount of at least one hydrogenation catalyst (component) of the type commonly employed in hydrocracking catalysts. The hydrogenation component is generally selected from the group of hydrogenation catalysts consisting of one or more metals of Group VIB and Group VIII, including the salts, complexes and solutions containing such. The hydrogenation catalyst is preferably selected from the group of metals, salts and complexes thereof of the group consisting of at least one of platinum, palladium, rhodium, iridium and mixtures thereof or the group consisting of at least one of nickel, molybdenum, cobalt, tungsten, titanium, chromium and mixtures thereof. Reference to the catalytically active metal or metals is intended to encompass such metal or metals in the elemental state or in some form such as an oxide, sulfide, halide, carboxylate and the like.

The hydrogenation catalyst is present in an effective amount to provide the hydrogenation function of the hydrocracking catalyst, and preferably in the range of from 0.05 to 25% by weight.

The catalyst may be employed in conjunction with traditional hydrocracking catalysts, e.g., any aluminosilicate heretofore employed as a component in hydrocracking catalysts. Representative of the zeolitic aluminosilicates disclosed heretofore as employable as component parts of hydrocracking catalysts are Zeolite Y (including steam stabilized, e.g., ultra-stable Y), Zeolite X, Zeolite beta (U.S. Pat. No. 3,308,069), Zeolite ZK-20 (U.S. Pat. No. 3,445,727), Zeolite ZSM-3 (U.S. Pat. No. 3,415,736), faujasite, LZ-10 (U.K. Pat. No. 2,014,970, June 9, 1982), ZSM-5-type zeolites, e.g., ZSM-5, ZSM-11, ZSM-12, ZSM-23, ZSM-35, ZSM-38, ZSM-48, crystalline silicates such as silicalite (U.S. Pat. No. 4,061,724), erionite, mordenite, offretite, chabazite, FU-1-type zeolite, NU-type zeolites, LZ-210-type zeolite and mixtures thereof. Traditional cracking catalysts containing amounts of $Na_2O$ less than about one percent by weight are generally preferred. The relative amounts of the SSZ-24 component and traditional hydrocracking component, if any, will depend at least in part, on the selected hydrocarbon feedstock and on the desired product distribution to be obtained therefrom, but in all instances an effective amount of SSZ-24 is employed. When a traditional hydrocracking catalyst (THC) component is employed the relative weight ratio of the THC to the SSZ-24 is generally between about 1:10 and about 500:1, desirably between about 1:10 and about 200:1, preferably between about 1:2 and about 50:1, and most preferably is between about 1:1 and about 20:1.

The hydrocracking catalysts are typically employed with an inorganic oxide matrix component which may be any of the inorganic oxide matrix components which have been employed heretofore in the formulation of hydrocracking catalysts including: amorphous catalytic inorganic oxides, e.g., catalytically active silica-aluminas, clays, silicas, aluminas, silica-aluminas, silica-zirconias, silica-magnesias, alumina-borias, alumina-titanias and the like and mixtures thereof. The traditional hydrocracking catalyst and SSZ-24 may be mixed separately with the matrix component and then mixed or the THC component and SSZ-24 may be mixed and then formed with the matrix component.

SSZ-24 can be used to convert light straight run naphthas and similar mixtures to highly aromatic mixtures. Thus, normal and slightly branched chained hydrocarbons, preferably having a boiling range above about 40° C. and less than about 200° C., can be converted to products having a substantial aromatics content by contacting the hydrocarbon feed with the zeolite at a temperature in the range of from about 400° C. to 600° C., preferably 480° C.–550° C. at pressures ranging from atmospheric to 10 bar, and liquid hourly space velocities (LHSV) ranging from 0.1 to 15.

The conversion catalyst preferably contain a Group VIII metal compound to have sufficient activity for commercial use. By Group VIII metal compound as used herein is meant the metal itself or a compound thereof. The Group VIII noble metals and their compounds, platinum, palladium, and iridium, or combinations thereof can be used. The most preferred metal is platinum. The amount of Group VIII metal present in the conversion catalyst should be within the normal range of use in reforming catalysts, from about 0.05 to 2.0 weight percent, preferably 0.2 to 0.8 weight percent.

The zeolite/Group VIII metal conversion catalyst can be used without a binder or matrix. The preferred inorganic matrix, where one is used, is a silica-based binder such as Cab-O-Sil or Ludox. Other matrices such as magnesia and titania can be used. The preferred inorganic matrix is nonacidic.

It is critical to the selective production of aromatics in useful quantities that the conversion catalyst be substantially free of acidity, for example by poisoning the zeolite with a basic metal, e.g., alkali metal, compound. The zeolite is usually prepared from mixtures containing alkali metal hydroxides and thus have alkali metal contents of about 1–2 weight percent. These high levels of alkali metal, usually sodium or potassium, are unacceptable for most catalytic applications because they greatly deactivate the catalyst for cracking reactions. Usually, the alkali metal is removed to low levels by ion-exchange with hydrogen or ammonium ions. By alkali metal compound as used herein is meant elemental or ionic alkali metals or their basic compounds. Surprisingly, unless the zeolite itself is substantially free of acidity, the basic compound is required in the present process to direct the synthetic reactions to aromatics production.

The amount of alkali metal necessary to render the zeolite substantially free of acidity can be calculated using standard techniques based on the aluminum content of the zeolite. Under normal circumstances, the zeolite as prepared and without ion-exchange will contain sufficient alkali metal to neutralize the acidity of the catalyst. If a zeolite free of alkali metal is the starting material, alkali metal ions can be ion exchanged into the zeolite to substantially eliminate the acidity of the zeolite. An alkali metal content of about 100%, or greater, of the acid sites calculated on a molar basis is sufficient.

Where the basic metal content is less than 100% of the acid sites on a molar basis, the test described in U.S. Pat. No. 4,347,394 which patent is incorporated totally herein by reference, can be used to determine if the zeolite is substantially free of acidity.

The preferred alkali metals are sodium and potassium. The zeolite itself can be substantially free of acidity only at very high silica:alumina mol ratios; by "zeolite consisting essentially of silica" is means a zeolite which is substantially free of acidity without base poisoning.

The conversion of hydrocarbonaceous feeds can take place in any convenient mode, for example, in fluidized bed, moving bed, or fixed bed reactors depending on the types of process desired. The formulation of the catalyst particles will vary depending on the conversion process and method of operation.

Other reactions which can be performed using the catalyst of this invention containing a metal, e.g., platinum, include hydrogenation-dehydrogenation reactions, denitrogenation and desulfurization reactions.

SSZ-24 can be used in hydrocarbon conversion reactions with active or inactive supports, with organic or inorganic binders, and with and without added metals. These reactions are well known to the art, as are the reaction conditions.

SSZ-24 can also be used as an adsorbent, as a filler in paper, paint, and toothpastes, and as a water-softening agent in detergents.

The following examples illustrate the preparation of SSZ-24.

EXAMPLES

EXAMPLE 1

Preparation of N,N,N-Trimethyl-1-adamantanammonium

Hydroxide (Template A)

Ten (10) grams of 1-adamantanamine (Aldrich) was dissolved in a mixture of 29 gms tributylamine and 60 mls dimethylformamide. The mixture was chilled in an ice bath.

28.4 Grams of methyl iodide were added dropwise to the chilled solution with continuous stirring. After several hours crystals appear. The reaction was continued overnight and allowed to come to room temperature. The crystals were filtered and washed with tetrahydrofuran and then diethyl ether before vacuum drying. Additional product was obtained by adding enough diethyl ether to the reaction filtrate to produce two phases and then with vigorous stirring acetone was added until the solution just became one phase. Continued stirring produced crystallization at which time the solution can be chilled to induce further crystallization. The product has a melting point near 300° C. (decomp.) and the elemental analyses and NMR are consistent with the known structure. The vacuum-dried iodide salt was then ion-exchanged with ion-exchange resin AG 1×8 (in molar excess) to the hydroxide form. The exchange was performed over a column or more preferably by overnight stirring of the resin beads and the iodide salt in an aqueous solution designed to give about a 0.5 molar solution of the organic hydroxide. This produces Template A.

EXAMPLE 2

A reaction solution was formed from mixing the following reagents. 0.13 Grams of KOH(s) was dissolved in 11.6 ml $H_2O$ containing an additional 4.2 gms of Template A (0.71 M) solution. 1.20 gms of Cabosil M5 was added with stirring. A pea-shaped teflon-coated stir bar was used and kept in the vessel during reaction. The synthetic reaction was carried out in a Parr 4745 reactor at 160° C. for 6 days. The reactor was mounted onto a spit in a Blue M oven and rotated at 30 RPM. After cooling the reactor, the contents were poured into a filter and washed repeatedly with distilled water. After drying the sample in air and then at 100° C., the product was examined by X-ray diffraction (XRD) and found to be zeolite SSZ-24. The X-ray diffraction pattern for this product is given in Table 2 below.

TABLE 2

| 2 θ | d/n | $I/I_o$ |
|---|---|---|
| 7.50 | 11.79 | 98 |
| 13.00 | 6.81 | 10 |
| 15.00 | 5.91 | 46 |
| 19.91 | 4.46 | 100 |
| 21.42 | 4.15 | 36 |
| 22.64 | 3.93 | 87 |
| 25.13 | 3.54 | 4 |
| 26.16 | 3.41 | 44 |
| 29.37 | 3.04 | 13 |
| 30.31 | 2.949 | 30 |
| 34.07 | 2.631 | 5 |
| 34.86 | 2.574 | 20 |
| 37.41 | 2.404 | 4 |
| 38.29 | 2.351 | 7 |

The x-ray diffraction pattern for SSZ-24 and AlPO-5 are essentially the same. Unit cell parameters for SSZ-24 and AlPO-5 are given below in Table 3.

TABLE 3

|  | AlPO-5 | SSZ-24 As Prepared | SSZ-24 Calcined |
|---|---|---|---|
| a = | 13.726 | 13.62 | 13.62 |
| c = | 8.484 | 8.296 | 8.324 |

EXAMPLE 3

A reaction was set up as in Example 2. But in this instance, seeds of the product of Example 2 were added and the reaction was carried out as before but without agitation. The product upon analogous workup and analysis was about 80% SSZ-24 with the remainder being a layered silica related to Kenyaiite and a small quantity of zeolite SSZ-23.

EXAMPLE 4

In this example aluminum was incorporated into the framework of the zeolite. A reaction mixture was put together as in Example 2. This time 0.06 gms of $Al_2(SO_4)_3 * 18 H_2O$ was also added to the reaction. Care was taken to obtain good dispersion of the aluminum upon mixing so that aluminum-rich gradients are minimized. The $SiO_2/Al_2O_3$ ratio in the synthesis mixture was 200. The crystalline products obtained from carrying out the reaction as in Example 2 are SSZ-24 (major component) and the Kenyaiite-like phase (minor component).

EXAMPLE 5

The crystalline products of Examples 2 and 4 were subjected to calcination as follows. The samples were heated in a muffle furnace from room temperature up to 540° C. at a steadily increasing rate over a 7-hour period. The samples were maintained at 540° C. for four more hours and then taken up to 600° C. for an additional four hours. A 50/50 mixture of air and nitrogen was passed over the zeolite at a rate of 20 standard cubic feet per minute during heating. The calcined product of Example 2 had the x-ray diffraction lines indicated in Table 4 below.

TABLE 4

| $2\theta$ | d/n | $I/I_o$ |
|---|---|---|
| 7.50 | 11.79 | 100 |
| 12.98 | 6.82 | 18 |
| 15.00 | 5.91 | 9 |
| 19.89 | 4.46 | 34 |
| 21.35 | 4.16 | 14 |
| 22.60 | 3.93 | 36 |
| 25.08 | 3.55 | 1 |
| 26.13 | 3.41 | 20 |
| 29.32 | 3.05 | 6 |
| 30.27 | 2.953 | 23 |
| 34.00 | 2.637 | 2 |
| 34.82 | 2.576 | 10 |
| 37.35 | 2.408 | 2 |
| 38.21 | 2.355 | 3 |

EXAMPLE 6

Ion-exchange of the calcined materials from Example 5 was carried out using $NH_4NO_3$ to convert the zeolites from its K form to NH4 and then eventually H form. Typically the same mass of $NH_4NO_3$ as zeolite was slurried into $H_2O$ at ratio of 50/1 $H_2O$ to zeolite. The exchange solution was heated at 100° C. for two hours and then filtered. This process was repeated four times. Finally, after the last exchange the zeolite was washed several times with $H_2O$ and dried. A repeat calcination as in Example 5 was carried out but without the final treatment at 600° C. This produces the H form of the zeolites. The surface area for this material was 300 $m^2/gm$. The micro pore volume was 0.12 cc/gm as determined by BET method with $N_2$ as absorbate.

EXAMPLE 7

Constraint Index Determination 0.25 Grams of the hydrogen form of the zeolite of Example 4 (after treatment according to Examples 5 and 6) was packed into a 3/8" stainless steel tube with alundum on both sides of the zeolite bed. A Lindburg furnace was used to heat the reactor tube. Helium was introduced into the reactor tube at 10cc/min. and atmospheric pressure. The reactor was taken to 250° F. for 40 min. and then raised to 800° F. Once temperature equilibration was achieved a 50/50, w/w feed of n-hexane and 3-methylpentane was introduced into the reactor at a rate of 0.62 cc/hr. Feed delivery was made via syringe pump. Direct sampling onto a gas chromatograph begun after 10 minutes of feed introduction. Constraint Index values were calculated from gas chromatographic data using methods known in the art.

| Example No. | C.I. | Conversion at 10 min. | Temp. °F. |
|---|---|---|---|
| 4 | 0.5 | 5% | 800 |

EXAMPLE 8

A catalyst was prepared as in Example 6 and was impregnated with a platinum tetramine dinitrate solution to give a final platinum loading of 0.8% Pt. After calcination, the catalyst was screened for reforming. A light paraffinic $C_5$–$C_7$ sraight run stream was run over the catalyst under the following conditions:

| LSHV | = | 6 |
|---|---|---|
| $H_2$/HC | = | 6 |
| PSIG | = | 100 |
| Temp. | = | 920° F. |

The catalyst showed 11% conversion of $C_6+C_7$ paraffins over several hours on stream with a 55% selectivity to aromatics and an 89% liquid volume yiled, indicating that there was very little extraneous cracking.

What is claimed is:

1. A zeolite having a mole ratio of an oxide selected from silicon oxide, germanium oxide and mixtures thereof to an oxide selected from aluminum oxide, gallium oxide, iron oxide, boron oxide and mixtures thereof greater than about 100:1, and having the X-ray diffraction lines of Table 1.

2. A zeolite having a composition, as synthesized and in the anhydrous state, in terms of mole ratios of oxides as follows: (0.1 to 10)$Q_2O$:(0.1 to 5.0)$M_2O$:$W_2O_3$: (greater than 100) $YO_2$ wherein M is an alkali metal cation, W is selected from aluminum, gallium, iron, boron and mixtures thereof, Y is selected from silicon, germanium and mixtures thereof, Q is an adamantane quaternary ammonium ion and having the X-ray diffraction lines of Table 1.

3. The zeolite according to claim 2 wherein W is aluminum and Y is silicon.

4. A zeolite prepared by thermally treating the zeolite of claim 3 at a temperature from about 200° C. to 820° C.

5. A zeolite according to claim 2 wherein the adamantane quaternary ammonium ion is derived from an adamantane compound of the formula:

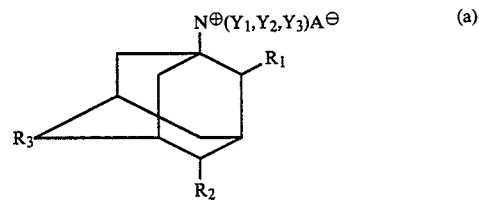

wherein each of $Y_1$ $Y_2$ and $Y_3$ independently is lower alkyl and $A^\ominus$ is an anion which is not detrimental to the formation of the zeolite; and each of $R_1$, $R_2$ and $R_3$ independently is hydrogen, or lower alkyl; or

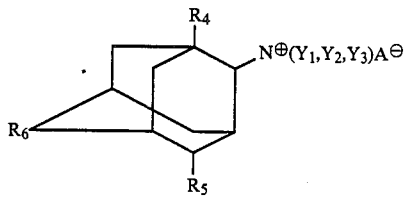 (b)

wherein each of $R_4$, $R_5$ and $R_6$ independently is hydrogen or lower alkyl; each of $Y_1$, $Y_2$ and $Y_3$ independently is lower alkyl; and $A^\ominus$ is an anion which is not detrimental to the formation of the zeolite.

6. A zeolite according to claim 5 wherein in formula (a) each of $Y_1$, $Y_2$ and $Y_3$ independently is methyl or ethyl; $A^\ominus$ is OH or halogen; and each of $R_1$, $R_2$, and $R_3$ is hydrogen; and in formula (b) each of $Y_1$, $Y_2$ and $Y_3$ independently is methyl or ethyl; $A^\ominus$ is OH, or halogen; and each of $R_4$, $R_5$ and $R_6$ is hydrogen.

7. A zeolite according to claim 6 wherein $Y_1$, $Y_2$ and $Y_3$ are the same and each is methyl; and $A^\ominus$ is OH, or I.

8. A zeolite according to claim 1 or 2 which has undergone ion exchange with hydrogen, ammonium, rare earth metal, Group IIA metal, or Group VIII metal ions.

9. A zeolite according to claim 1 or 2 wherein rare earth metals, Group IIA metals, or Group VIII metals are occluded in the zeolite.

10. A zeolite composition, comprising the zeolite of claim 1 or 2 and an inorganic matrix.

* * * * *